United States Patent [19]

Callan et al.

[11] 3,729,657

[45] Apr. 24, 1973

[54] CODED CIRCUIT MOUNTING DEVICE WITH COVER

[75] Inventors: John E. Callan, Milwaukee; Lawrence F. Freitag, Bayside, both of Wis.

[73] Assignee: Allen-Bradley Company, Milwaukee, Wis.

[22] Filed: July 15, 1971

[21] Appl. No.: 162,880

[52] U.S. Cl.............317/101 DH, 317/120, 339/17 L

[51] Int. Cl...............................................H05k 5/03

[58] Field of Search...............317/118, 120, 101 DH; 339/17 R, 17 C, 17 L, 17 LC, 17 M, 17 LM, 18 C, 176 MF, 176 MP

[56] References Cited

UNITED STATES PATENTS

| | | | |
|---|---|---|---|
| 3,631,299 | 12/1971 | Meyer | 317/101 DH |
| 3,573,711 | 4/1971 | Henschen | 339/176 MP |
| 3,533,045 | 10/1970 | Henschen | 339/17 L |
| 3,550,062 | 12/1970 | Drenten | 339/17 LM |
| 3,404,362 | 10/1968 | Amendola | 339/17 LC |
| 3,413,594 | 11/1968 | Fernold | 339/17 LC |

FOREIGN PATENTS OR APPLICATIONS

| | | | |
|---|---|---|---|
| 666,905 | 9/1964 | Italy | 317/101 CB |

*Primary Examiner*—Robert K. Schaeffer
*Assistant Examiner*—Gerald P. Tolin
*Attorney*—Arthur H. Seidel et al.

[57] ABSTRACT

A mounting enclusure for a plug-in circuit card having a cover into which the card is inserted for retention therein, and a base upon which the card and cover are detachably mounted. The base has a number of electrical connector pins that mate with a female connector on the card and a plurality of cavities each formed to accept one end of a circuit card ke, with the opposite end of the key protruding outward from the base. The circuit card has a notch, or notches, in one edge that coincides with circuit card keys protruding from the base when the card and base are connected together. By inserting a key or keys in particular ones of the key cavities, the base is coded to receive only a circuit card with mating notches. The electrical circuit on the card is identified by its edge notching, and thus key location in a base identified the card and circuit which is to be attached to the base. Mounted on the circuit card is a latch that engages the cover to semi-permanently affix the circuit card in the cover when the card is inserted therein.

8 Claims, 10 Drawing Figures

INVENTORS
JOHN E. CALLAN
LAWRENCE F. FREITAG

BY Arthur H. Seidel

ATTORNEY

INVENTORS
JOHN E. CALLAN
LAWRENCE F. FREITAG

BY

Arthur H. Seidel

ATTORNEY

INVENTORS
JOHN E. CALLAN
LAWRENCE F. FREITAG

BY
Arthur H. Seidel

ATTORNEY

CODED CIRCUIT MOUNTING DEVICE WITH COVER

BACKGROUND OF THE INVENTION

Circuit card mounting assemblies consisting of plug-in circuit cards and enclosures into which the cards are inserted have proved to be extremely valuable. When mounted in a typical enclosure, the cards may be electrically disconnected and physically removed from the enclosure in a matter of seconds. Reinsertion of the plug-in cards can be performed in approximately the same amount of time. Such ready removal and insertion is especially useful for repair purposes. If a card proves defective, it may quickly be replaced with a spare card, and the defective card may then be taken to a work area for repair.

There are many different types of mounting enclosures for such plug-in cards, but there is a standardization of these different mounting enclosures in that they are normally built to mount multiple cards. This is because the electronic circuitry contained on each card normally comprises only a small portion of a larger electronic circuit, and because it is also common practice to mount circuit cards comprising several different electronic circuits in the same mounting enclosure to reduce the amount of wiring needed to interconnect the circuits. Due to these reasons, multi-card mounting enclosures are ideally suited for large electronic installations. However, with the increased use of plug-in circuit cards there are frequent occasions when the use of such multi-card mounting enclosures is a detriment. This problem occurs with persons who employ a small amount of electronic circuitry that is contained on only one or two cards. Although these persons often desire to use plug-in cards, one or two cards do not generally warrant the employment of a multi-card mounting enclosure. Another instance when the use of a multi-card mounting enclosure is disadvantageous occurs when a multi-card device is already being used, but has been filled to capacity. If the need for another card then arises, purchase of a multi-card mounting enclosure is not warranted. Such a purchase would be wasteful, not only of money, but also of the space in which the new mounting enclosure must be located. Since both of these factors are generally of importance, there is a need for a smaller mounting enclosure that mounts only one or two cards at a time.

Single card mounting enclosures have been available, but they lack versatility. It would be desirable to have a card, normally protected by a cover, that could easily be removed from and replaced in its cover. Thus, substitution of cards with different circuits, or replacement of defective cards, could be easily accomplished. Further, the interchangeability of cards with any particular mounting base could be facilitated by the insertion of a correct, pre-selected card on the base, while other cards are rejected by the base. The base is then coded to receive the proper card, and if the coding can be varied, then the base can be used in a variety of installations. The coding would be selected for a given installation so as to receive the proper card for the particular circuit requirement. As a result, the card and its base will have the versatility to be tailored for a variety of circuits, and each base may be coded so that it will only receive the proper card. As a result, only a few standard component parts would satisfy one's requirements.

In the past there has been no such mounting enclosure that has satisfied the above recited objectives. Heretofore, if one desired to use plug-in circuit cards, the only alternative to the multi-card assemblies has been a mounting enclosure that permanently houses a card in its cover, and there has been no coding to identify a card with a proper base. Thus, the problem of a lack of a satisfactory mounting enclosure for an individual circuit card has remained.

SUMMARY OF THE INVENTION

The present invention resides in a mounting enclosure for a single plug-in circuit card member having a base member that may be mounted on an electrical rack, or other convenient location, which includes an electrical connector positioned to mate with a second connector on the card member to electrically connect the card member to the base, coding keys on one of the members and a profile on the other member permits mounting of the correct card member on the base member, and the card member semi-permanently resides in a cover which can be securely attached to the base member.

A preferred form of the invention has a base containing a number of cavities in which one or more circuit card keys may be interchangeably positioned to partially protrude from the base. A circuit card that contains one or more notches in an edge that coincides with the protruding portion of the circuit card keys is detachably mounted upon the base. The keys may be inserted in different cavities of the base in order that only a particular card with mating notches may be mounted on the base. By rearranging the keys, the base can be adapted to receive different cards at different times, so that the base can call for a proper card for a particular circuit into which the base is connected.

The circuit card has a mounting aperture shaped to accept a resilient latch, which together with a catch on the cover acts to semi-permanently secure the circuit card in the cover. The cover fastens to the base member to provide a housing for the card that protects the card from abuse.

It is an object of this invention to provide a mounting enclosure for a single plug-in type circuit card in which the card and base to which it is attached are coded by key profiles that match the correct card with the proper base.

It is a further object to provide a mounting enclosure comprised of a base member that may be interchangeably utilized with a plurality of different circuit cards, one at a time.

It is another object to provide a mounting enclosure with a standardized circuit card configuration in which different cards may contain various electrical circuits.

It is another object to provide a mounting enclosure with keying means that may be varied in position to prevent the connection of improper circuit cards to the base of the enclosure.

It is still another object to provide a mounting enclosure with a protective cover that semi-permanently fastens over a circuit card, and also is attachable to a base to operatively comprise with the base an integral enclosed housing.

The foregoing and other objects and advantages of the invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figures 1, 10:
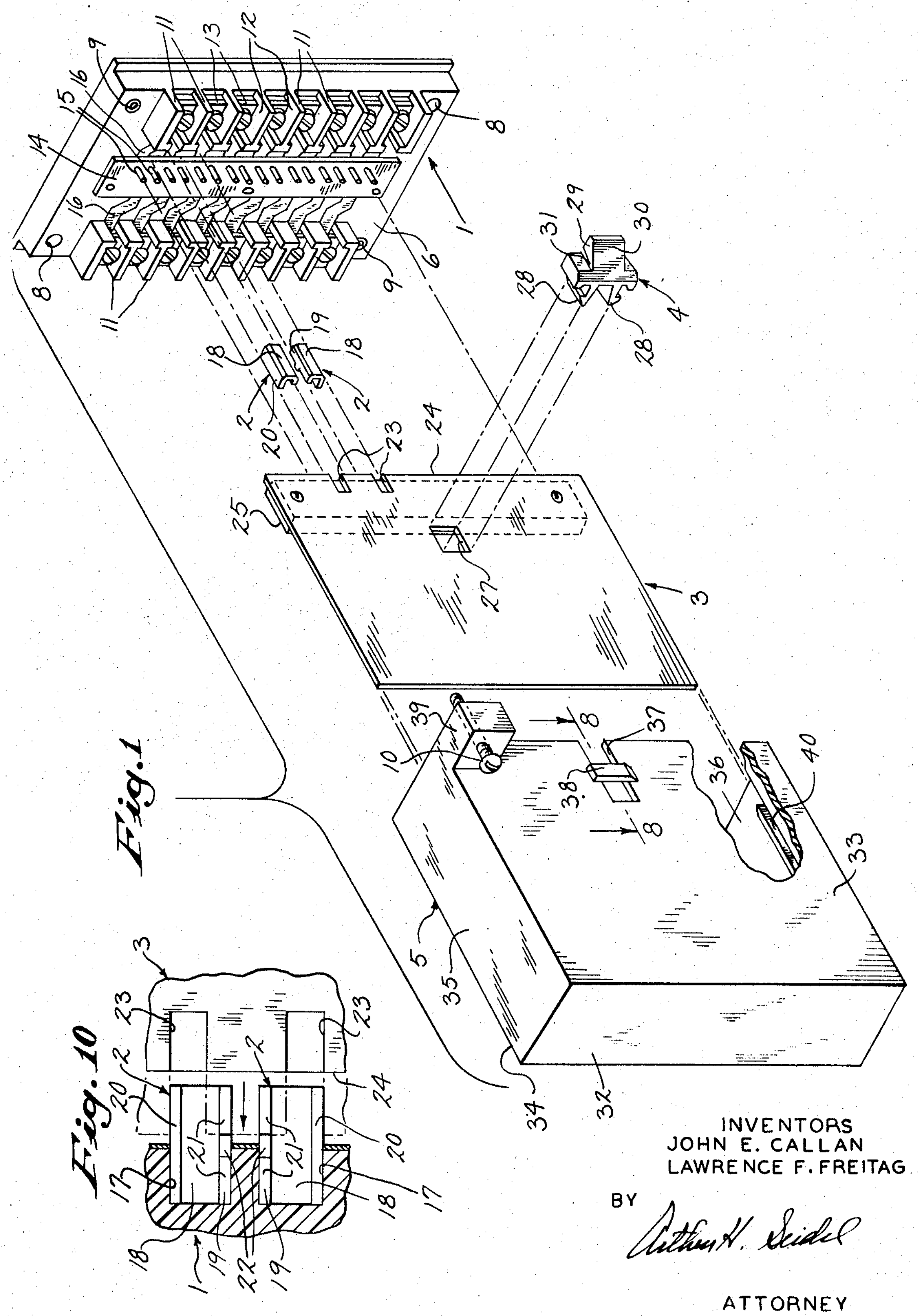
FIG. 1 is an exploded view in perspective of a circuit card mounting enclosure embodying the invention.
FIG. 10 is a fragmentary view taken through the plane 10—10 indicated in FIG. 7, with the circuit card spaced a short distance from the base.
Figure 2:
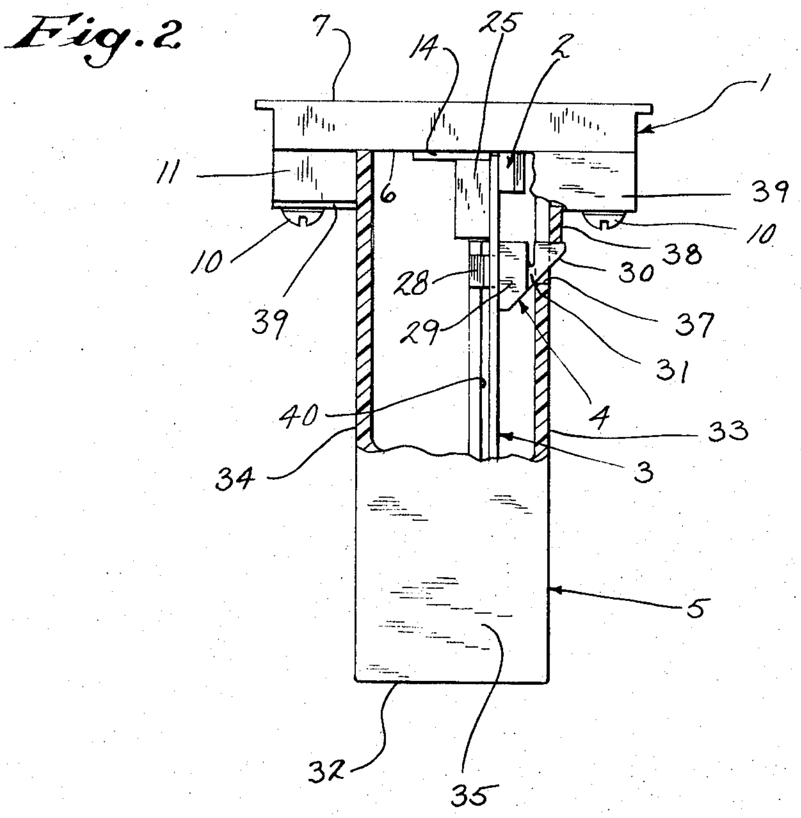
FIG. 2 is a top view of the circuit card mounting enclosure with parts broken away to show interior construction.

Referring now to the drawings, FIG. 1 is an exploded perspective view that shows from right to left a base plate 1, a pair of channel shaped circuit card keys 2, a printed circuit card 3, a latch 4, and a rectangular box-like cover 5. These parts are shown assembled in FIG. 2, where the cover 5 is mounted on the base plate 1 with the circuit card 3 housed within an enclosure formed of the base plate 1 and the cover 5.

Figure 3:
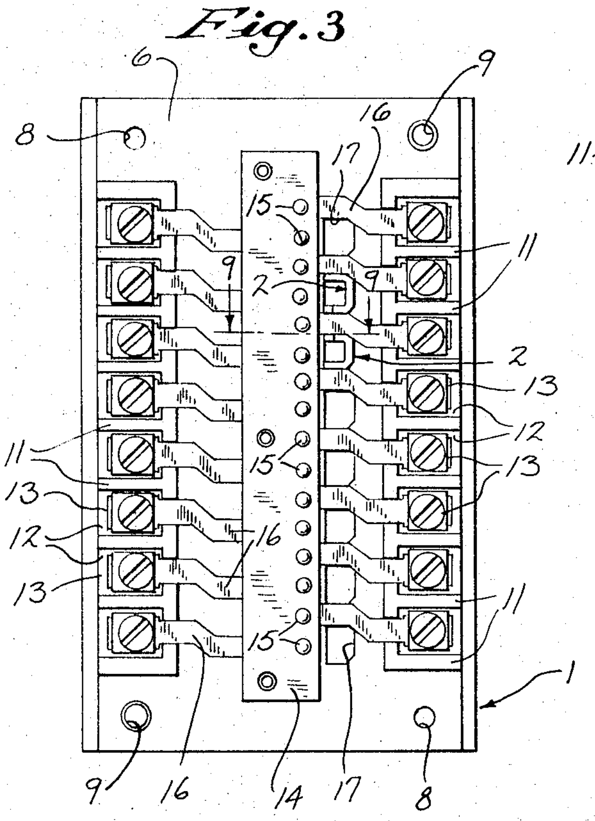
FIG. 3 is a front view of a base forming part of the mounting enclosure into which a pair of circuit card keys have been inserted, as occurs when the parts are assembled.
Figure 4:
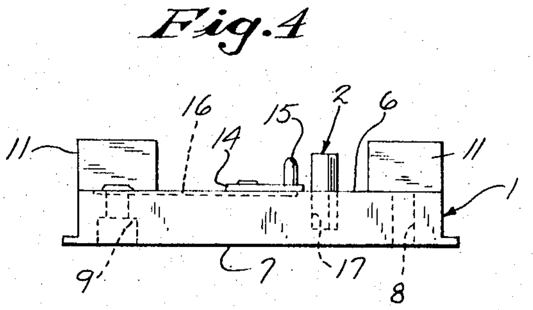
FIG. 4 is a top view of the base shown in FIG. 3.

The base plate 1 is molded with a generally rectangular configuration when viewed from the front, as shown in FIG. 3. It has a front face 6, a flat mounting face 7 at its rear, and a pair of mounting holes 8 in two diagonally opposite corners. A pair of internally threaded inserts 9 are affixed in the remaining two corners to receive mounting screws 10 for the cover 5. The front face 6 has integrally formed left hand and right hand sets of ribs 11 that are mirror images of one another. As viewed from the front (see FIG. 3) the uppermost and lowermost ribs in each set 11 are L shaped, and the remaining ribs are T shaped. Each set of ribs 11 extends along a side margin of the front face 6 to act as insulating partitions forming a plurality of separate cubicles 12. Each of the cubicles 12 contains a terminal 13 with an appropriate terminal screw for fastening electrical conductors to the base plate 1.

An elongate, vertically disposed, connector strip 14 is secured to the front face 6 medially of the two sets of ribs 11, and projecting through the strip 14 is a vertical row of spaced connector pins 15. A plurality of thin, flat electrical conductors 16 lie in shallow, mating recesses in the front face 6, and each conductor 16 extends between one of the terminals 13 and the rear of one of the connector pins 15, to thereby electrically connect each pin 15 to a terminal 13.

Figure 9:
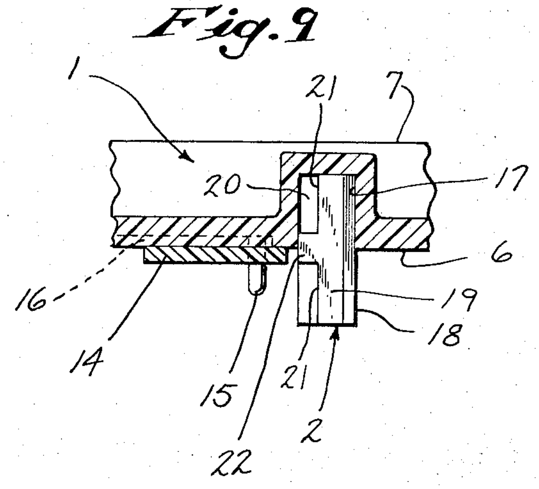
FIG. 9 is a fragmentary view in section of a part of the base through the plane 9—9 indicated in FIG. 3, showing on an enlarged scale the manner of mounting a circuit card key in the base.
Figure 6:
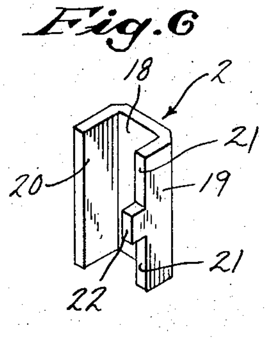
FIG. 6 is a view in perspective of one of the circuit card keys that is insertable into the base.

A number of cavities 17 are formed in the front face 6 along one side of the connector strip 14. Each cavity 17 is six sided, as particularly shown in FIG. 3, and extends for a substantial depth into the base plate 1, as indicated in FIGS. 9 and 10. Cavities 17 are each shaped to slidably accept one end of a circuit card key 2, as further shown in FIGS. 9 and 10. The opposite end of each key 2 protrudes from the front face 6. Each key 2 is channel shaped, having a central web 18 and opposite side flanges 19 and 20, as shown in FIG. 6. The side flange 19 of each key 2 is notched at its upper and lower ends to form two steps 21 with a tab 22 therebetween. By having two steps 21, either end of the circuit card key 2 may be inserted in one of the cavities 17 with one of the steps 21 being exposed forward of the front face 6. When a key 2 is viewed from one of its ends, it is seen to be six sided, similarly as the cavities 17, in order that a key 2 can only be inserted with the tab 22 facing inward, toward the connector strip 14. The tab 22 makes for a firm fit with the cavity wall so that a key 2 is positioned without undue looseness when inserted in a cavity 17.

Figure 8:
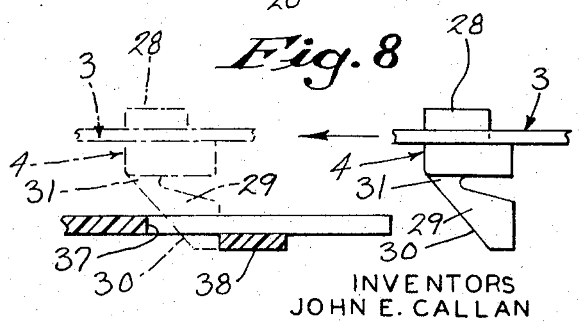
FIG. 8 is a fragmentary view of the cover and circuit card showing a latch that ties the parts together when assembled.

Referring back to FIG. 1, the circuit card 3 is relatively thin and rectangularly shaped. The circuit card 3 has a pair of notches 23 at its rear edge 24. An elongate electrical connector 25, having rearward facing sockets 26 adapted to receive the pins 15, is disposed on a side of the circuit card 3 with its rearward facing surface flush with the circuit card edge 24. A mounting aperture 27 is formed in the circuit card 3 and is adapted to receive a pair of mounting arms 28 on one side of the resilient latch 4. On the opposite side of the latch 4 is a wedge segment 29 with a slanting face 30. As shown in FIG. 8, the wedge segment 29 is joined to the latch proper by a thin web 31 in order that the segment 29 can flex with a hinge-like motion. The latch 4 is mounted on the circuit card 3 to form a circuit card assembly that is slidably received inside the cover 5.

Figure 5:
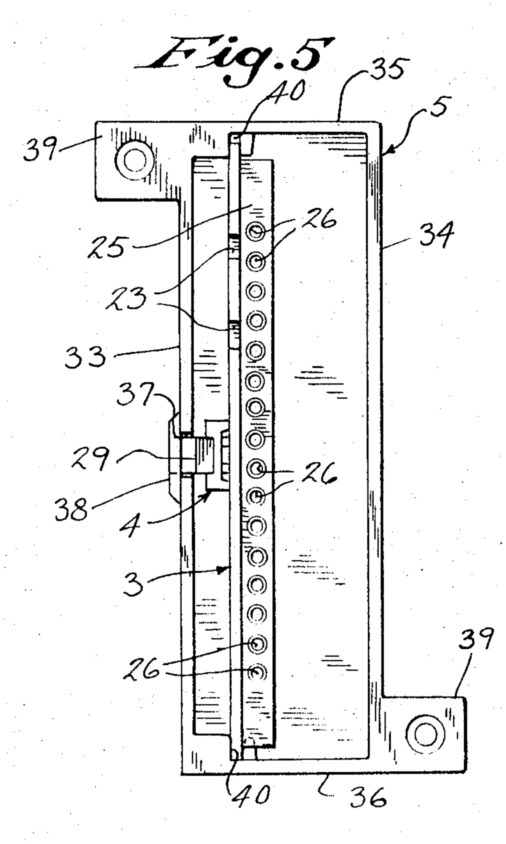
FIG. 5 is a rear view looking into a cover forming part of the mounting enclosure, in which cover there is inserted a circuit card, as occurs when the parts are assembled.

The cover 5 is shown in FIG. 1 as a rectangular shaped enclosure with a front wall 32, a pair of side walls 33 and 34, a top 35 and a bottom 36. The rear of the cover 5 is open to receive the circuit card 3, and this open rear fits up against the front face 6 of the base 1. The side wall 33 has a slot 37 extending forward from its rear edge and the slot 37 is bridged by an integrally formed catch 38 on the outer surface of the side wall 33. Referring back to FIG. 5, the cover 5 also has a pair of mounting feet 39 integrally formed at two diagonally opposite corners of the cover open end. When the cover 5 is assembled on the base 1, the feet 39 overlie the threaded inserts 9 and the mounting screws 10 and the feet 39 can be brought down tight to hold the cover 5 in place. The inner surfaces of the cover top 35 and the cover bottom 36 have an integrally formed channel 40 which mirror one another and act as tracks into which top and bottom edges of circuit card 3 are positioned when it is inserted into the cover 5.

With the above structure in mind, assembly of the mounting enclosure will now be described. The first step is to insert the circuit card assembly, consisting of the circuit card 3 and mounting latch 4, into the cover 5. As indicated by FIG. 1 the latch 4 mounts on the circuit card 3 so that the latch wedge segment 29 protrudes from one side of the circuit card 3 with its slanting side 30 facing away from the circuit card notched edge 24. To insert the card 3 into the cover 5 the front end of the card 3 is guided into the open rear of the cover 5 in such fashion that the top and bottom edges of the card 3 are positioned into the mirrored channels 40 formed on the inner surfaces of the cover top 35 and bottom 36. The channels 40 thereafter guide the card 3 as it is further inserted into the cover 5 to a homed position.

As the circuit card 3 is inserted into the cover 5, the tip of the latch wedge segment 29 freely moves into the cover side wall lot 37 through which it protrudes. This free movement continues until the slanting face 30 of the latch 4 engages the catch 38. At that time, increased force must be applied to further insert the circuit board 3 because the protruding tip of the wedge segment 29 must be forced under and beyond the catch 38. During this movement, the resiliency and the peculiarly formed shape of the wedge segment 29 becomes particularly important. As the wedge segment 29 is forced against the catch 38, the web 31 of the wedge segment 29 allows the segment 29 to tile inward. Concurrently, the end of the cover side wall 33 on which the catch 38 is formed is pushed slightly outward. As a result of these two displacements, the tip of the wedge segment 29 slides under the catch 38. Thereupon, further insertion of the circuit card 3 causes the wedge segment 29 to move past the catch 38 and spring back to its normal configuration to protrude through the opening circumscribed by the end portion of the sidewall slot 37 and the catch 38. When the wedge segment 29 is in this position, the catch 38 acts to prevent withdrawal of the circuit card 3 from the cover 5, as seen in FIG. 8, and the end of the channel 40 prevents further insertion of the card 3 into the cover 5.

The circuit card 3 is designed to semi-permanently reside inside the cover 5, but should it become necessary to remove the card 3 from the cover 5, this can easily be accomplished by applying an outward directed pressure against and perpendicular to the slotted end of the side wall 33. In this way, the side wall 33, although substantially rigid, may be forced away from the circuit card 3 a sufficient distance for the catch 38 to release the latch 4, and permit the circuit card 3 to be withdrawn. Thus, it can be seen that insertion or removal of the card 3 is a relatively simple procedure.

Figure 7:
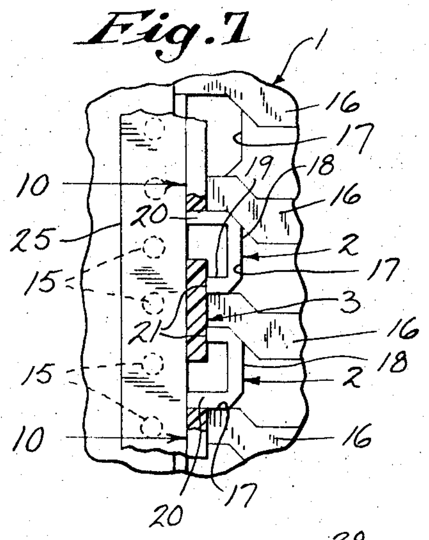
FIG. 7 is a fragmentary view of the circuit card assembled with the base, in which the card is in partial section, showing the interfitting with the circuit card keys mounted in the base.

After insertion of the circuit card 3 into the cover 5, the card and its cover are attached to the base plate 1. However, before the attachment is made to the base plate 1, the pair of the circuit card keys 2 are inserted in two of the cavities 17 of the base plate 1. The keys 2 are inserted in the proper cavities 17 in order that the circuit card notches 23 in the card edge 24 are aligned with the keys 2 as the base plate 1 and circuit card 3 are connected together. Thereupon, the notches 23 coincide with the protruding portions of the key flanges 20, and the protruding key flange steps 21 coincide with portions of the circuit card edge 24. This alignment between the pair of circuit card keys 2 and the circuit card 3 is shown in both FIGS. 7 and 10. The connection between the base plate 1 and the circuit card 3 is made through the mating of the connector pins 15 of the base plate 1 with the connector sockets 26.

Upon connecting of the card 3 to the base plate 1, the cover mounting screws 10 are screwed into the threaded inserts 9 of the base plate 1, to securely fasten the cover 5 together with the inserted circuit card 3 to the base plate 1.

The invention as described provides a mounting enclosure having several advantages, one of the principal advantages of which is the installation flexibility that is inherent in a single circuit card assembly. Such enclosure may be mounted in numerous ways in a minimum of space, and offers a relatively inexpensive method for installing a small number of circuit cards.

The individual components of the invention are designed to promote this inherent installation flexibility. The base plate 1 and the cover 5 may be used with a plurality of different cards having differing circuits. This feature allows a user of the present invention to interchangeably reuse the base plate 1 and the cover 5 whenever circuit modifications are needed. If additions to a present circuit are foreseen, spare base plates 1 may be kept on hand. Thereafter, when a new card 3 is needed, one of the spare base plates 1 may be prewired in readiness for when the new card 3 arrives, at which time it can instantly be installed without further delay.

The circuit card keys 2 and notches 23 act as a coding to prevent connection of the wrong circuit card 3 to a particular base plate 1, thereby decreasing the risk of damage to the cards 3 and circuit malfunctions through such an improper connection. The arrangement of the circuit card keys 2 may quickly be changed by removing a key 2 from one of the key cavities 17 and inserting it in another of the cavities 17. Through the rearrangement of a pair of keys 2 in the eight cavities 17 of the preferred embodiment, over one-hundred differently notched cards 3 may be employed with each base 1. Obviously, the number of selections may be increased greatly by the use of additional keys. The protrusion of the keys provide a profile for the base 1, and the notches 23 in the card 3 provide a corresponding profile. When the profiles match, the card 3 can be fully homed on the base 1, but if there is a mismatch of profiles, the card 3 cannot be properly mounted. By arranging the base profile through the insertion of keys 2 in desired cavities 17, the base is coded to receive only a particular circuit card.

The cover 5 not only serves to protect the circuit card 3, inserted within, but it also semi-permanently retains the card 3, and when the cover 5 is fastened to the base plate 1, it acts to solidly maintain the connection between the card 3 and the base plate 1. In this way, both the prevention of circuit card damage and continuum of operativeness is achieved, and as a result a highly desirable mounting device for a single circuit card is made available.

We claim:

1. In a mounting enclosure for a circuit card the combination comprising:

a base member having an electrical connector;

a circuit card member assembled alongside said base member with a second electrical connector engaged with the connector of said base member for electrical connection with the base member;

a cover member mounted against said base member having a front wall, opposite side walls, a top and a bottom enclosing the circuit card member and having an open rear through which the circuit card member is inserted, such open rear facing and being closed by said base member;

coupling means associated with the cover member and the circuit card member comprising latching means extending from one of the members and a catch means on the other member, which catch means and latching means overlap one another in latched engagement, securing the circuit card member semi-permanently in the cover member; and coding means associated with the base member and circuit card member comprising key means extending from one of the members and a profile on the other member matching said key means that are in mating assembly with one another.

2. In a mounting enclosure for a circuit card the combination of:

a base with a front face having a first electrical connector and a set of cavities formed in said front face;

a circuit card key inserted into one of said cavities with a segment of said circuit card key protruding outward from said front face;

a circuit card mounted on said base that has a notch in one edge, and a second electrical connector that mates with said first electrical connector to electrically connect said circuit card to the base, said notch of said circuit card in register with the protruding portion of said circuit card key;

a latch member having mounting means affixing said latch member to said card; and a cover enclosing the circuit card and having a side wall with a slot, a catch bridging said slot and engaging the latch member to semi-permanently secure the circuit card in said cover, fastening means connecting said cover to said base and guide means receiving a pair of opposed edges of the circuit card.

3. The combination of claim 2 in which the base comprises:

a plate with a front face having terminals, electrical connector pins protruding outward from said front face of said plate, a plurality of electrical conductors which connect said terminals with said electrical connector pins, and said set of cavities are aligned parallel to said electrical connector pins.

4. The combination of claim 3 in which there is a pair of channel shaped circuit card keys each having a central web and opposite side flanges, each circuit card key is slidably inserted endwise into one of said cavities of said base with a portion of said circuit card key protruding from said front face of said base, and a flange of each key in register with a notch of the circuit card when said base and said circuit card are connected together.

5. The combination of claim 4 in which the circuit card to be mounted in the mounting enclosure comprises:

a generally rectangular shaped board having a pair of notches in one edge, a mounting aperture and a second electrical connector in which a plurality of sockets are disposed, said second electrical connector slidably engages the first electrical connector to electrically connect said circuit card to said base plate.

6. The combination of claim 5 in which the latch member has a pair of mounting arms positioned on one side and a wedge segment protruding from an opposite side, said mounting arms snugly fitting through the mounting aperture in the circuit card and affixing said latch member to said circuit card.

7. The combination of claim 6 in which the wedge shaped segment has a slanting face and is joined to the latch proper by a web that allows the wedge segment to flex with a hinge-like motion.

8. In a mounting enclosure for a circuit card the combination comprising:

a circuit card member having an electrical connector;

a cover member housing the circuit card member and having an open rear through which said circuit card member is inserted;

coupling means associated with the cover member and the circuit card member comprising a latching means extending from one of the members and a catch means on the other member positioned in the path of travel of said latching means as the circuit card member is inserted into said cover member, the latching means engaging the catch means and securing the circuit card member semi-permanently within the cover member;

a base member on which said cover member is mounted closing the open rear of said cover, and having a second electrical connector in mating electrical connection with the connector of said circuit card and attaching said base member to said circuit card member; and coding means associated with the base member and circuit card member comprising key means extending from one of the members and a profile on the other member matching said key means attaching the members and joining the connectors.

* * * * *